Patented Aug. 10, 1954

2,686,159

UNITED STATES PATENT OFFICE 2,686,159

REMOVAL OF ENTRAINED METALLIC MERCURY FROM ALUMINA HYDROSOLS

Glenn M. Webb, Western Springs, Ill., and Llewellyn Heard, Hammond, Ind., assignors to Standard Oil Company, Chicago, Ill., a corporation of Indiana No Drawing. Application November 29, 1950, Serial No. 198,234

2 Claims. (Cl. 252—313)

This invention relates to a process for making alumina hydrosols by peptization of amalgamated aluminum, as originally described in United States Reissue Patent 22,196, issued October 6, 1942 to Llewellyn Heard. More particularly, our invention relates to the purification of alumina hydrosols produced according to the said prior-art method, and to modifications and equivalents thereof.

In the Heard method for preparing alumina hydrosols referred to above, amalgamated aluminum metal is contacted with a dilute aqueous solution of a weak organic acid, such as acetic acid. An alumina hydrosol is readily formed in this way, and has proved to be a very useful and advantageous raw material for the preparation of various types of adsorbent and catalytic materials. It has been found, however, that the said alumina hydrosols are contaminated with a substantial proportion of the mercury used for amalgamating the aluminum metal, the mercury being finely divided and dispersed therein as the free metal. This constitutes not only a considerable economic loss, but also a serious health hazard, owing to the fact that the contaminating mercury is ultimately vaporized and released in drying the solids into which the alumina hydrosol is subsequently converted.

We have now discovered that entrained metallic mercury can be removed from alumina hydrosols by contacting the hydrosols with amalgamated aluminum metal. The mercury droplets appear to collect on the amalgamated surfaces of the aluminum metal (non-amalgamated aluminum being comparatively ineffective for the desired purpose), and the mercury may thereafter be recovered as such or recycled in the form of the amalgam for additional hydrosol formation.

One object of our invention is to purify mercury-contaminated alumina hydrosols. Another object is to remove entrained metallic mercury from alumina hydrosols. A further object is to recover entrained metallic mercury from alumina hydrosols. A still further object is to facilitate the recovery and recycling of mercury in the preparation of alumina hydrosols according to the Heard technique. An additional object is to provide a convenient source of amalgamated aluminum for use in preparing alumina hydrosols according to the Heard technique. Other objects of our invention and its advantages over the prior art will be apparent from the following description thereof.

In one embodiment of the Heard process for preparing alumina hydrosols, metallic aluminum in any convenient form is charged to a closed reaction vessel, equipped with a perforated false bottom and a vented top and blanketed with hydrogen to prevent access of air. The aluminum is preamalgamated by pumping into the reaction vessel a dilute aqueous solution of a mercury salt, such as mercuric nitrate, and allowing the solution to remain in contact with the aluminum at ordinary temperatures (around 60 to 80° F.) for approximately 5 minutes, at the end of which time the amalgamation is adequate. The amalgamating solution is then drawn off.

The peptizing solution, preferably aqueous 1 to 4 percent acetic, formic, tartaric, or other acid of low ionization constant, or an aluminum salt thereof, is then introduced into the reactor, and the formation of alumina hydrosol begins at once, with voluminous evolution of hydrogen, which serves to agitate the mixture of liquid and metal. The reaction is expedited by operation at elevated temperatures above about 160° F. and at somewhat elevated pressures as required to maintain liquid-phase conditions within the reaction vessel. The resulting hydrosol is withdrawn, free from salts of mercury, and containing up to about 4 percent of $Al_2O_3$ and up to about 0.05 weight-percent of suspended metallic mercury.

The entrained metallic mercury is removed according to our invention by contacting the alumina hydrosol with amalgamated aluminum at ordinary or somewhat elevated temperatures, preferably up to about 200° F., and under autogenous pressures. This operation may be carried out by any convenient means. For example, we may slurry the alumina hydrosol with amalgamated alumina; and after the materials have been sufficiently contacted (ordinarily from about 5 to 30 minutes), the aluminum (now carrying substantially all of the mercury) is withdrawn by filtration, centrifugation, settling and decanting, or the like. Alternatively, we may pass the alumina hydrosol downward or preferably upward through a reaction zone packed with amalgamated aluminum.

Metallic aluminum of substantially any mechanical form may be employed in our process, but is preferably chosen according to the method of contacting the alumina hydrosol. In the slurry technique, the alumina hydrosol is preferably contacted with aluminum powder, particles, pellets, or the like. In packed reactors, we can use aluminum plates, screen, foil, strips, wire, buttons, shot, turnings, borings, shavings, or the like. Other forms may also be used.

Amalgamation of the aluminum is effected by flooding the metal with an aqueous solution of a mercury salt, or by adding a mercury salt to the alumina hydrosol to be treated preferably to a small initial portion thereof, or by adding an oxide of mercury to the hydrosol. Alternatively the aluminum metal may be contacted with alumina hydrosol containing metallic mercury; comparatively slow amalgamation is effected in this way, and the hydrosol may optionally be recycled at first to effect satisfactory removal of mercury therefrom. In all cases, the aluminum should be clean, and especially in the last method the oxide coating of the aluminum surface should preferably be held to a minimum.

We have observed that only a very thin layer of amalgam forms on the surface of the aluminum, and that any excess mercury which collects on the amalgamated surface tends ultimately to drop away therefrom and to accumulate at the bottom of the contacting zone, from which it can be withdrawn. The amalgamated aluminum may thus be employed indefinitely in purifying alumina hydrosol, the recovered mercury being recycled for the production of additional alumina hydrosol. Alternatively, the amalgamated aluminum may be withdrawn from time to time and may itself be used for the production of additional alumina hydrosol.

Our invention will be more fully understood from the following specific example.

Example

An alumina sol, prepared by contacting amalgamated aluminum with aqueous 2.0 percent acetic acid at 160° F., was found to contain 4.2 percent $Al_2O_3$ and 0.049 percent by weight of mercury. The sol was treated according to the following procedure to remove the entrained mercury therefrom.

A glass tower 0.5 inch in diameter and 4 inches long was packed through 4.0 inches of its length with ⅛-inch circular discs of "2S-O" aluminum, a metal of high purity containing 99.5 weight-percent aluminum. The discs were subjected to preamalgamation by filling the tower with an aqueous 5.0 percent solution of mercuric acetate and allowing to stand for five minutes at room temperature. The mercuric acetate solution was then withdrawn. Subsequently, the alumina sol was passed upward through the tower at room temperature at the rate of ten milliliters per minute, and the treated sol emerging therefrom was found to contain only 0.01 percent by weight of mercury, corresponding to an 80 percent removal of the mercury initially present therein.

While we have described our invention with reference to one specific embodiment thereof, it is to be understood that we are not limited thereto. In general, it can be said that any modifications or equivalents of our invention that would ordinarily occur to one skilled in the art are to be considered as lying within the scope of our invention.

In accordance with the foregoing description, we claim as our invention:

1. A process for purifying an alumina hydrosol containing mercury dispersed therein as the free, finely divided metal, which comprises contacting metallic aluminum with an aqueous solution of a salt of mercury, whereby an amalgam of aluminum is formed on the surface thereof, thereafter passing said alumina hydrosol through said amalgamated aluminum in a treating zone, whereby said free, finely divided mercury is deposited on the amalgamated surfaces of said aluminum, and withdrawing a hydrosol having a substantially depleted content of mercury.

2. A process for purifying an alumina hydrosol containing around 4 per cent of $Al_2O_3$ by weight and around 0.05 per cent by weight of mercury dispersed therein as free, finely divided metallic mercury, which comprises disposing metallic aluminum in a treating zone, passing an aqueous solution of a salt of mercury through said zone, whereby an amalgam of aluminum is formed on the surface of the metallic aluminum in said treating zone, thereafter passing said hydrosol upward through said treating zone, whereby the free, finely divided mercury in said hydrosol is deposited on the amalgamated surfaces of said aluminum and drops therefrom as a liquid, withdrawing liquid mercury from the bottom of said treating zone, and withdrawing a purified alumina hydrosol from the top of said treating zone containing not more than about 0.01 per cent by weight of mercury.

References Cited in the file of this patent

UNITED STATES PATENTS

| Number | Name | Date |
|---|---|---|
| 2,449,847 | Heard | Sept. 21, 1948 |